United States Patent
Adelberg et al.

(10) Patent No.: US 8,040,533 B2
(45) Date of Patent: Oct. 18, 2011

(54) TECHNIQUES FOR GRANULAR FONT SUBSETTING FOR EFFICIENT DOCUMENT CONSUMPTION

(75) Inventors: Brian S. Adelberg, Issaquah, WA (US); Khaled S. Sedky, Sammish, WA (US); Mahmood A. Dhalla, Sammish, WA (US); Oliver H. Foehr, Mercer Island, WA (US); Clifton Kerr, Edmonds, WA (US)

(73) Assignee: Microsoft Corporation, Redmond, WA (US)

( * ) Notice: Subject to any disclaimer, the term of this patent is extended or adjusted under 35 U.S.C. 154(b) by 1093 days.

(21) Appl. No.: 11/327,678

(22) Filed: Jan. 6, 2006

(65) Prior Publication Data

US 2007/0159646 A1    Jul. 12, 2007

(51) Int. Cl.
*G06K 15/02* (2006.01)
*G01S 13/00* (2006.01)
*B41J 9/44* (2006.01)
*B41J 3/26* (2006.01)
*B41J 2/00* (2006.01)
*B41J 3/01* (2006.01)

(52) U.S. Cl. ......... 358/1.11; 358/470; 342/195; 400/61; 400/70; 400/92; 400/103; 400/109

(58) Field of Classification Search ............... 358/1.11, 358/470; 342/192, 195; 345/116, 467; 400/61, 400/70, 92, 103, 109, 118.2
See application file for complete search history.

(56) References Cited

U.S. PATENT DOCUMENTS

| 5,940,581 A * | 8/1999 | Lipton | 358/1.11 |
| 6,313,920 B1 * | 11/2001 | Dresevic et al. | 358/1.11 |
| 7,095,518 B1 * | 8/2006 | Keeney et al. | 358/1.15 |
| 7,281,208 B2 * | 10/2007 | Kerr | 715/201 |
| 2005/0128513 A1 * | 6/2005 | Cho | 358/1.15 |

* cited by examiner

*Primary Examiner* — Benny Tieu
*Assistant Examiner* — Ngon Nguyen

(57) ABSTRACT

Techniques are provided for performing font subsetting. One or more font subsetting parameters are received. The one or more font subsetting parameters indicate a granularity level for which font subsetting is performed for portions of a data container. The font subsetting parameters indicate a font subsetting granularity level other than an entire document associated with the data container. A first portion of the data container is determined in accordance with the font subsetting granularity level. A subset of font data for at least one font family is determined in accordance with what font data for the at least one font family is actually used by the first portion. The subset of font data is embedded in an output for a consumer.

20 Claims, 6 Drawing Sheets

TECHNIQUES FOR GRANULAR FONT SUBSETTING FOR EFFICIENT DOCUMENT CONSUMPTION

BACKGROUND

A document may utilize one or more different fonts or font families. Data for the fonts may be embedded within the document itself. The font data embedded in the document may be an entire font file for a font family even though portions of the font file may not be utilized by the document. In other words, the document may only utilize a portion of the font data embedded in the document. One drawback of embedding the entire font file within the document is that the document size may be very large. To work around the foregoing drawback, documents may include a subset of the font file. In connection with subsetting a font, the document includes only the font data that is actually used by the document rather than the whole font file for the particular font family. While performing font subsetting and including only a subset portion of the font data within a document may decrease the size of the document, other drawbacks may be present. The font subsetting may be performed at the document level meaning that all the font data to be embedded in the document cannot be determined until the document is processed. This can be a problem when the document is being consumed, for example, for streaming consumption in which the document is typically consumed as it is being produced.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are techniques for performing font subsetting. One or more font subsetting parameters are used to determine a granularity level for which font subsetting is performed. The granularity level may specify a portion of a data container ranging from a portion of a document or page, to multiple documents. A first portion of data is determined in accordance with the font subsetting granularity level. A subset of font data actually used in the first portion is determined and embedded in an output for a consumer.

DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
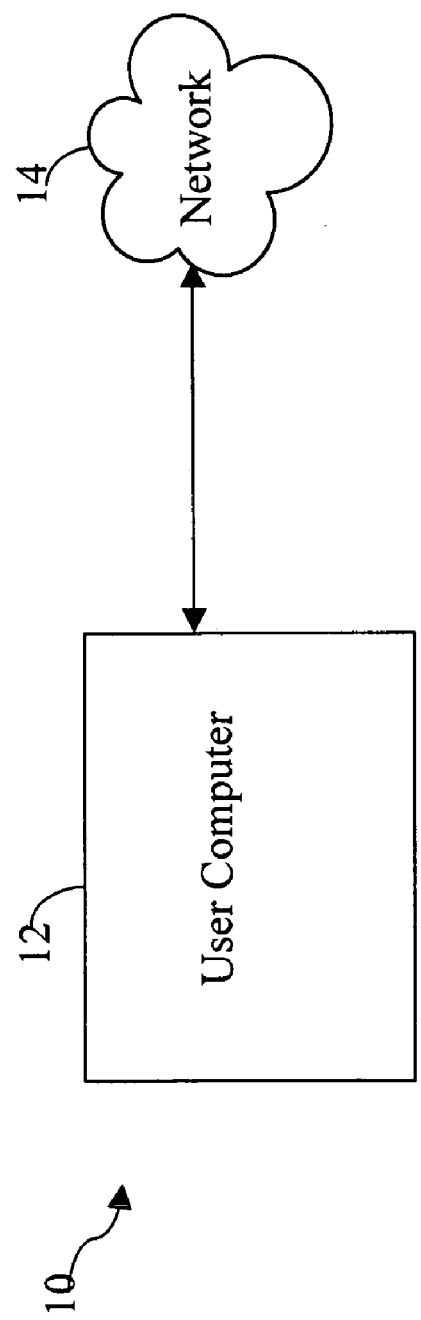
FIG. 1 is an example of an embodiment illustrating an environment that may be utilized in connection with the techniques described herein.

Referring now to FIG. 1, illustrated is an example of a suitable computing environment in which embodiments utilizing the techniques described herein may be implemented. The computing environment illustrated in FIG. 1 is only one example of a suitable computing environment and is not intended to suggest any limitation as to the scope of use or functionality of the techniques described herein. Those skilled in the art will appreciate that the techniques described herein may be suitable for use with other general purpose and specialized purpose computing environments and configurations. Examples of well known computing systems, environments, and/or configurations include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The techniques set forth herein may be described in the general context of computer-executable instructions, such as program modules, executed by one or more computers or other devices. Generally, program modules include routines, programs, objects, components, data structures, and the like, that perform particular tasks or implement particular abstract data types. Typically the functionality of the program modules may be combined or distributed as desired in various embodiments.

Included in FIG. 1 is a user computer 12 and a network 14. The user computer 12 may include a standard, commercially-available computer or a special-purpose computer that may be used to execute one or more program modules. Described in more detail elsewhere herein are program modules that may be executed by the user computer 12 in connection with facilitating the font subsetting techniques described herein. The user computer 12 may operate in a networked environment and communicate with other computers not shown in FIG. 1.

It will be appreciated by those skilled in the art that although the user computer is shown in the example as communicating in a networked environment, the user computer 12 may communicate with other components utilizing different communication mediums. For example, the user computer 12 may communicate with one or more components utilizing a network connection, and/or other type of link known in the art including, but not limited to, the Internet, an intranet, or other wireless and/or hardwired connection(s).

Figure 2:
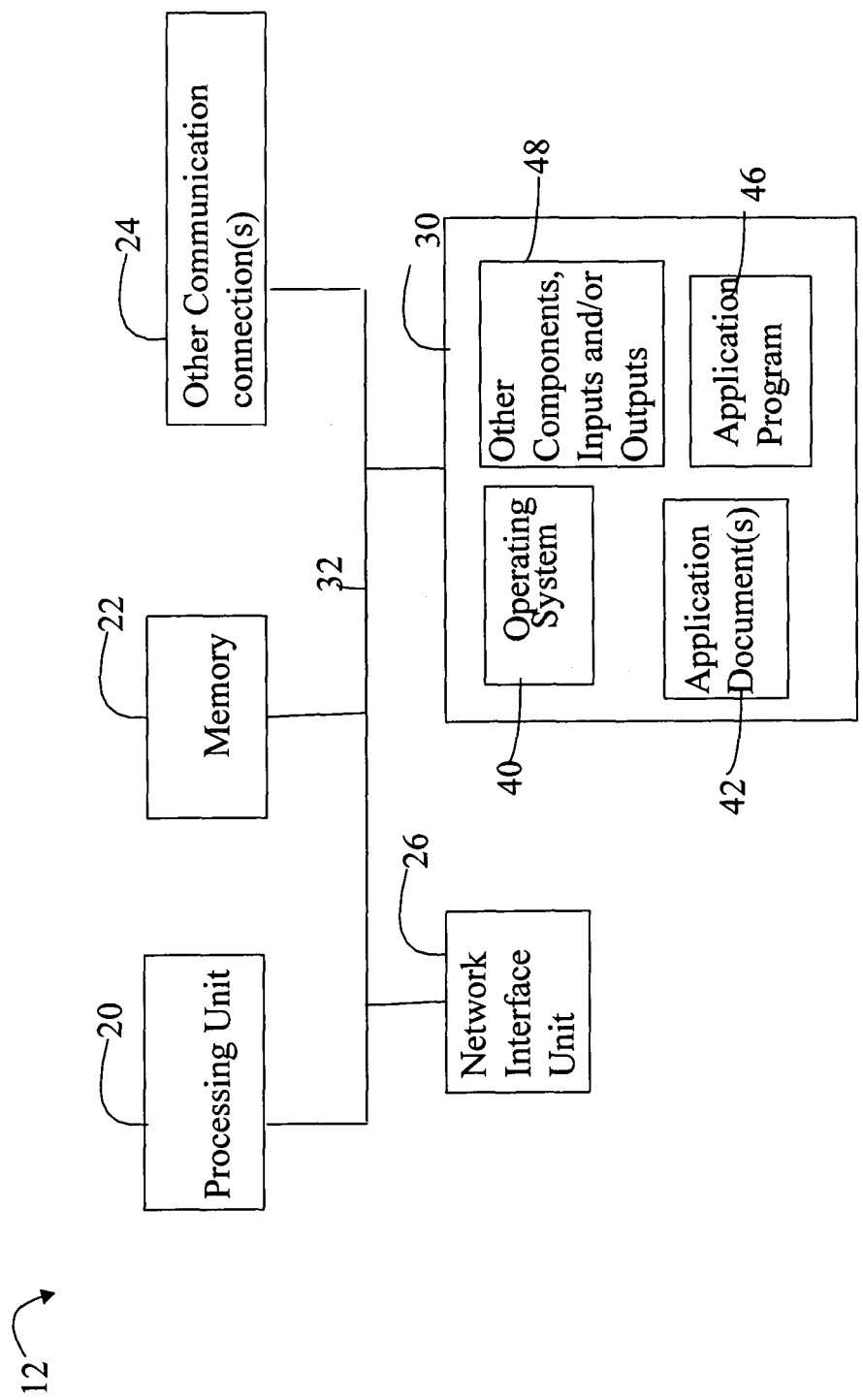
FIG. 2 is an example of components that may be included in an embodiment of a user computer for use in connection with performing the techniques described herein.

Referring now to FIG. 2, shown is an example of components that may be included in a user computer 12 as may be used in connection with performing the various embodiments of the techniques described herein. The user computer 12 may include one or more processing units 20, memory 22, a network interface unit 26, storage 30, one or more other communication connections 24, and a system bus 32 used to facilitate communications between the components of the computer 12.

Depending on the configuration and type of user computer 12, memory 22 may be volatile (such as RAM), non-volatile (such as ROM, flash memory, etc.) or some combination of the two. Additionally, the user computer 12 may also have additional features/functionality. For example, the user computer 12 may also include additional storage (removable and/or non-removable) including, but not limited to, USB devices, magnetic or optical disks, or tape. Such additional storage is illustrated in FIG. 2 by storage 30. The storage 30 of FIG. 2 may include one or more removable and non-removable storage devices having associated computer-readable media that may be utilized by the user computer 12. The storage 30 in one embodiment may be a mass-storage device with associated computer-readable media providing non-volatile storage for the user computer 12. Although the description of computer-readable media as illustrated in this example may refer to a mass storage device, such as a hard disk or CD-ROM drive, it will be appreciated by those skilled in the art that the computer-readable media can be any available media that can be accessed by the user computer 12.

By way of example, and not limitation, computer readable media may comprise computer storage media and communication media. Memory 22, as well as storage 30, are examples of computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, (DVD) or other optical storage, magnetic cassettes, magnetic tape, magnetic disk storage or other magnetic storage devices, or any other medium which can be used to store the desired information and which can accessed by user computer 12. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The user computer 12 may also contain communications connection(s) 24 that allow the user computer to communicate with other devices and components such as, by way of example, input devices and output devices. Input devices may include, for example, a keyboard, mouse, pen, voice input device, touch input device, etc. Output device(s) may include, for example, a display, speakers, printer, and the like. These and other devices are well known in the art and need not be discussed at length here. The one or more communications connection(s) 24 are an example of communication media.

In one embodiment, the user computer 12 may operate in a networked environment as illustrated in FIG. 1 using logical connections to remote computers through a network. The user computer 12 may connect to the network 14 of FIG. 1 through a network interface unit 26 connected to bus 32. The network interface unit 26 may also be utilized in connection with other types of networks and/or remote systems and components.

One or more program modules and/or data files may be included in storage 30. During operation of the user computer 12, one or more of these elements included in the storage 30 may also reside in a portion of memory 22, such as, for example, RAM for controlling the operation of the user computer 12. The example of FIG. 2 illustrates various components including an operating system 40, one or more application programs 46, one or more application documents 42, and other components, inputs, and/or outputs 48. The operating system 40 may be any one of a variety of commercially available or proprietary operating system. The operating system 40, for example, may be loaded into memory in connection with controlling operation of the user computer. One or more application programs 46 may execute in the user computer 12 in connection with performing user tasks and operations.

Application documents 42 may be used with particular application programs 46. In one example, an application program may operate on application documents in accordance with a specified format. For example, in one embodiment, the application program 46 may process XPS (XML Paper Specification) Documents. The format of an XPS document may be characterized as a data container which may include multiple documents generated from one or many different sources. For example, an XPS document may include one or more Microsoft PowerPoint™ converted documents and one or more Microsoft Word™ converted documents. What will be described in following paragraphs are techniques that may be used in connection with performing font subsetting at varying levels of granularity. It should be noted that although reference may be made herein to particular documents, file types, and formats, such as the XPS format, those skilled in the art will appreciate that these references are examples made for purposes of illustrating the techniques described herein. The techniques described herein may be applied to other document formats which may or may not provide support for multiple document types and multiple documents within the same data container.

The techniques described in following paragraphs may be utilized in connection with font subsetting at a variety of different granularity levels. Font subsetting may be characterized as including only a portion of the font data as used in connection with a document. In other words, embedded in the document is the font data that is actually used by the document rather than an entire font file for the particular font family. Utilizing the techniques described herein, font subsetting may be performed with respect to varying portions of the document data. For example, font subsetting may be performed at the document level for an entire document, for a portion of a document such as one or more pages, or for multiple documents. The techniques described herein may also be used for performing font subsetting for a portion of a document page. The level of granularity determines that portion of the one or more documents for which font subsetting is performed and for which font data is generated. Font data may be embedded within a data container generated for consumption in accordance with each amount of processed document data as specified with the font subsetting granularity level. For example, if a specified level of font subsetting granularity is 3 pages, font data portions may be embedded within the generated data container for every 3 pages of processed document data to be consumed. As will be described in more detail, the generated data container may include portions of font data interwoven with the processed data to be consumed.

As described herein, the generated data container may include the one or more subsets of font data embedded therein. The generated data container may be consumed by a consumer process for an operation such as, for example, a printer for a printing operation. An application may be used in producing the generated data container in a specified format for a printer. In connection with the examples described herein, the application program may also be characterized as an example of a producer of the generated data container which is subsequently consumed by a consumer such as, for example, a printer. Other examples of consumers include print drivers and a display program or viewer. The foregoing are examples of the different types of consumers, producers, and associated operations that may be utilized in connection with the techniques described herein. It will be appreciated by those skilled in the art that the techniques described herein may be used with a variety of different consumers and producers in addition to those particular examples described herein for purposes of illustration.

What will now be described are the components, inputs and/or outputs represented by 48, in conjunction with the application program 46 and application document(s) 42, that may be utilized in connection with the font subsetting techniques described herein.

Figure 3:
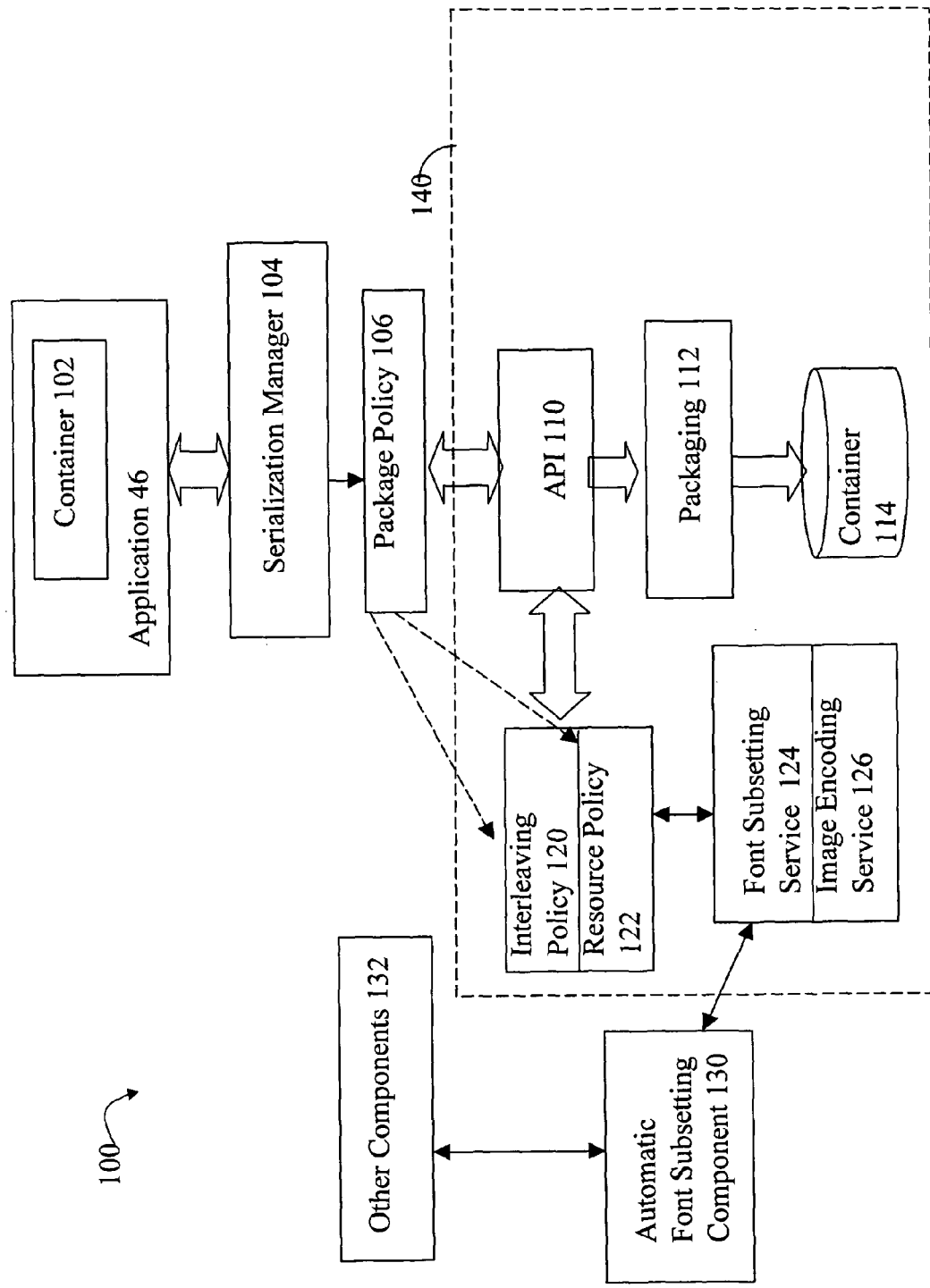
FIG. 3 is an example illustrating in more detail components from FIG. 2 that may be included in an embodiment utilizing the techniques described herein.

Referring now to FIG. 3, shown is an example illustrating in more detail components that may be included in an embodiment utilizing the techniques described herein. The example 100 includes an application program 46 which may operate on an XPS document as represented by the container 102. As described elsewhere herein, an XPS document may be characterized as a data container which can include multiple documents used in connection with other applications. In connection with descriptions herein, a container or data container may represent a data entity, such as a single document, multiple documents, and the like as may be included in a specified format associated with the data container. In this example, a user may issue a command to print or save the data container 102. The container 102 may be produced as a result of a user inputting data from one or more sources in a variety of different types such as, for example, images, spreadsheets, tables and text data. The container 102 may include multiple fonts and glyphs. If a document associated with the data container is 100 pages, for example, and the font subsetting level of granularity is at the document level, the printer consuming the print form of the document will not be able to begin the print operation until all 100 pages have been processed to determine the font information. Streaming consumption often requires that resources, such as fonts, come first in the physical layout of the file. Thus the all font data of the 100 pages would need to be kept in memory of the consumer until sub-setting is complete. This can present problems for the consumer, for example, if the font data is too large for memory available for use with the consumer. In accordance with techniques described herein for this example, font subsetting may be performed for the generated print document to be consumed by the printer. When the application 46 issues commands to create a data container 114 to be consumed by a printer or other consumer, the application 46 may instantiate an instance of the serialization manager 104 with parameters for different policy values including parameters for font subsetting.

In one embodiment, the serialization manager 104 may be invoked with runtime parameter values. A first parameter value may indicate the package policy 106 specifying the type of destination file type and/or format being produced for consumption. In other words, the package policy affects the generated container 114 which is produced for consumption. The generated container 114 may be, for example, a file type such as a ZIP package file and the package policy 106 may be a parameter specifying such a policy. As another example, the package policy 106 may be an HTTP policy indicating that the generated container 114 is destined for a website utilizing the HTTP protocol. As yet another example, the package policy may specify a file format and/or type for consumption by a printer. Depending on the packaging policy, one of a variety of different APIs 110 may be selected. The particular API may vary with the destination file type and/or format. The API 110 may operate in conjunction with the packaging component 112 to produce a container 114 in accordance with a particular file format. An embodiment may combine the functionality of the components 110 and 112 into a single component. Alternatively, an embodiment may also utilize more than one packaging component 112 with an API for a particular file type and/or format.

A second parameter value that may be specified with an invocation of the serialization manager 104 is an interleaving policy parameter indicating an interleaving policy 120. The interleaving policy 120 indicates an ordering in which the data is included in the generated container 114 for the particular consumer. In this instance 100, the producer, application program 46, may specify a particular ordering for the container 114 which is advantageous for use by the particular consumer, such as a printer. For example, the generated container 114 may include images and text. It may be advantageous for the printer to order the data in the container 114 such that the images are positioned prior to the text describing the images. Such an ordering of images followed by text may be produced using the packaging component 112 so that the images are consumed by the printer prior to the text portions.

Other parameter values may be specified for the resource policy 122 in connection with font subsetting and image encoding. One or more parameters may be specified for an image encoding service 126. The image encoding service 126 indicates how images are stored in the generated container 114.

It should be noted that there may be other parameters and associated policies included in an embodiment that differ from as described herein indicating how different types of information are stored in a generated container 114.

One or more parameters may be specified for a font subsetting service 124 in connection with specifying the font subsetting granularity. In one embodiment, a parameter value of DOCUMENT SEQUENCE may be specified to indicate that font subsetting is performed for all the documents included in the data container. In other words, the level of font subsetting granularity is across all the multiple documents included in the container 114 and font data is determined in one pass for all the documents. As described above, other granularities may also be specified. Use of DOCUMENT and COUNT parameters may be used to specify that font subsetting is performed at the single document level for one or more documents, but not for across all the documents in a container. A COUNT parameter may be an integer value indicating the number of documents for which the font subsetting is performed. In other words, use of an indicator, such as DOCUMENT, specifying font subsetting at the document level in conjunction with an integer value, such as COUNT, allows for specification of font subsetting at the document level for less than all the documents included in a container. An embodiment may also include functionality for specifying a font subsetting granularity for portions of single document. In one embodiment, these unit at the subdocument level may be at a page level. A parameter value of PAGE may be specified to indicate that font subsetting is performed at the page level. A COUNT value may be specified with the PAGE parameter to indicate that font subsetting is performed for a particular number of pages. For example, specifying parameters of PAGE with a COUNT of 3 indicates that font subsetting is performed for every 3 pages and font data is generated for the consumer for each 3 pages of processed document data. Consider, for example, when an XPS data container is being created for consumption by a printer using the XPS API. Font subsetting may be performed utilizing the API for every 3 pages. This means that for every font family being used in those 3 pages, the API detects what font data in that font family is being used in those 3 pages. Once this is known, a font file representing that particular font family is created and the subset of the font data used in the 3 pages is inserted into this font file. This font file is then embedded into the generated data container. In a generated data container that a consumer, such as a printer, may receive, that font part is transmitted first, after which data representing the 3 pages are transmitted to the printer. The foregoing processing of sending the font subsetting data prior to the 3 pages, or other portion for which font subsetting is performed, ensures that the consumer has the data needed to render those 3 pages. The font subsetting resulting in a font file embedded in the data sent to the consumer is performed for each font family used in those 3 pages. If a second font family is used by those 3 pages, a second font file including the appropriate subset portion thereof is also transmitted to the consumer prior to the 3 pages of data to be rendered. An example of a generated data container is described in more detail in following paragraphs.

An embodiment may also utilize other parameter values to specify that font subsetting be performed for a granularity level of less than a page such as, for example, a defined region or portion of a page. As an example, data included in one page may have a size which is on the order of several GB or gigabytes. One or more parameters may be specified in an embodiment in connection with indicating a page subdivision level of granularity.

In connection with FIG. 3, the parameter values specified with the instantiation of the serialization manager 104 may be utilized by the API 110 and/or the packaging module 112 to generate the container 114 for the consumer. The foregoing of having the producer specify the one or more font subsetting parameter values is one way in which the font subsetting parameters may be obtained. The producer may specify a font subsetting level of granularity in accordance with the particular consumer such as, for example, a particular printer. In other words, the producer may have specific knowledge of what font subsetting may assist the consumer in optimizing consumption of the generated container 114.

An embodiment may also obtain the font subsetting parameter values using other techniques such as, for example, using the automatic font subsetting component 130. The component 130 may automatically determine the font subsetting parameter values indicating a level of font subsetting granularity based on empirically determined heuristics. These heuristics may be determined, for example, based on statistical data gathered over a period of time. The specified level of font subsetting granularity may be set to an initial value that may also be adjusted as additional data is obtained and analyzed by other components 132. The font subsetting granularity may also vary with a particular consumer, such as a particular device. The selected set of parameter values may be stored elsewhere in a static form, such as in memory or on another form of storage. The selected set of parameter values may also be obtained dynamically during operation of the components at runtime by communicating with a device driver, spooler, or other component associated with a specified consumer. In other words, the component 130 may communicate with a driver or other component associated with a consumer for which the container 114 is destined. The spooler, driver, or other component may return one or more values which may, directly or indirectly, indicate a font subsetting granularity. As an example, the values returned by a device driver to the component 130 may directly indicate a font subsetting granularity level for a consumer device serviced by the device driver. Alternatively, the driver or other component may return other data values, such as process rates associated with the particular device serviced by the driver, which may be used by the component 130 in selecting a particular font subsetting granularity level.

It should be noted that an embodiment may include all, or only a portion of, the components of FIG. 3 in accordance with the particular techniques utilized therein to specify the font subsetting granularity parameters. An embodiment which allows a producer to specify the font subsetting granularity as well as provides for automatic font subsetting may include all the components of FIG. 3. An embodiment allowing a producer to specify the font subsetting without providing functionality for automatic font subsetting may omit components 130 and 132. In yet another embodiment, all the components of FIG. 3 may be included with different components conditionally operating at different times for specifying the font subsetting granularity level. For example, an embodiment may include functionality for producer-specified font subsetting granularity as well as the components 130 and 132. In this latter embodiment, the component 130 may be used, for example, for specifying default parameter values if there are no producer-specified font subsetting parameters. In other words, a producer may optionally specify runtime font subsetting parameters. However, in the event that the producer does not specify the parameters, the font subsetting granularity is determined in accordance with default values as may be determined using the component 130. A variation of an embodiment including all the components of FIG. 3 may also include a hardware and/or software setting indicating which of the multiple modes or techniques is to be used for obtaining the subsetting parameter values and associated font subsetting granularity level. For example, a first setting or indicator value may be specified, such as via a configuration or registry setting, indicating which technique is to be used. If the first indicator value indicates automatic font subsetting, the component 130 is utilized in determining the font subsetting granularity level, and any producer-specified parameter values may be ignored. Similarly, other modes for determining the foregoing font subsetting granularity level may be disabled and/or enabled in accordance with a particular indicator value. An embodiment may provide for modification of the indicator value during operation of a system causing subsequent font subsetting to be performed in accordance with the modified or updated indicator value. An embodiment may also determine the font subsetting parameters utilizing one or more of the foregoing techniques in combination.

It should be noted that an embodiment may also include other parameters than as described herein. For example, an embodiment may also include functionality for indicating that font subsetting is to be performed for only certain documents included in data container. A parameter may be specified to turn on or off font subsetting for particular types of documents (e.g., word processing documents, image documents of a certain type or format). Additionally, although automatic selection of a font subsetting granularity level is determined via communications between the particular components illustrated in FIG. 3 (e.g., between 130 and 124), an embodiment may utilize communications between different components than as illustrated in FIG. 3.

Figure 4:
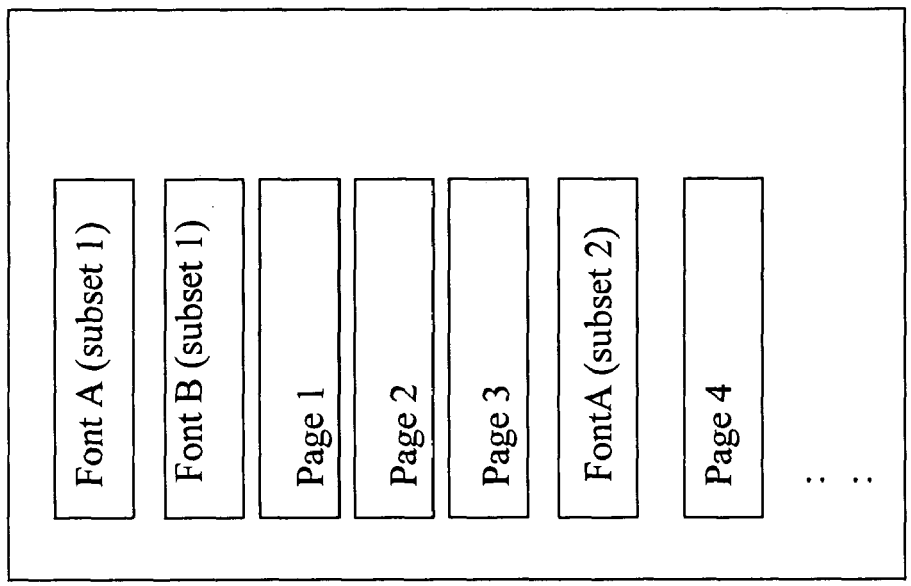
FIG. 4 is an example of a data container produced utilizing the font subsetting techniques described herein.

Referring now to FIG. 4, shown is an example of a container 114 as may be produced using the techniques described with the components included in FIG. 3. The container illustrated in the example 200 is generated using a font subsetting level of granularity of every 3 pages. The example 200 illustrates Font A (subset1) and Font B (subset1) as containing all the font data being used in Page 1 through Page 3. Additionally, Page 4 through Page 6 only use Font A and, in particular, use font data specified as Font A (subset 2). The foregoing illustrates that every subset of font data associated with a particular portion of data in accordance with the font subsetting granularity level may be characterized as self contained.

This allows consumers that have limited memory to discard a subset of font data associated with a first data portion, such as the first 3 pages, after processing the first 3 pages since all consecutive portion of data have their own self contained subset of font data that will satisfy processing requirements for those pages without the need of caching previous font data subsets associated with other portions.

Figure 5:
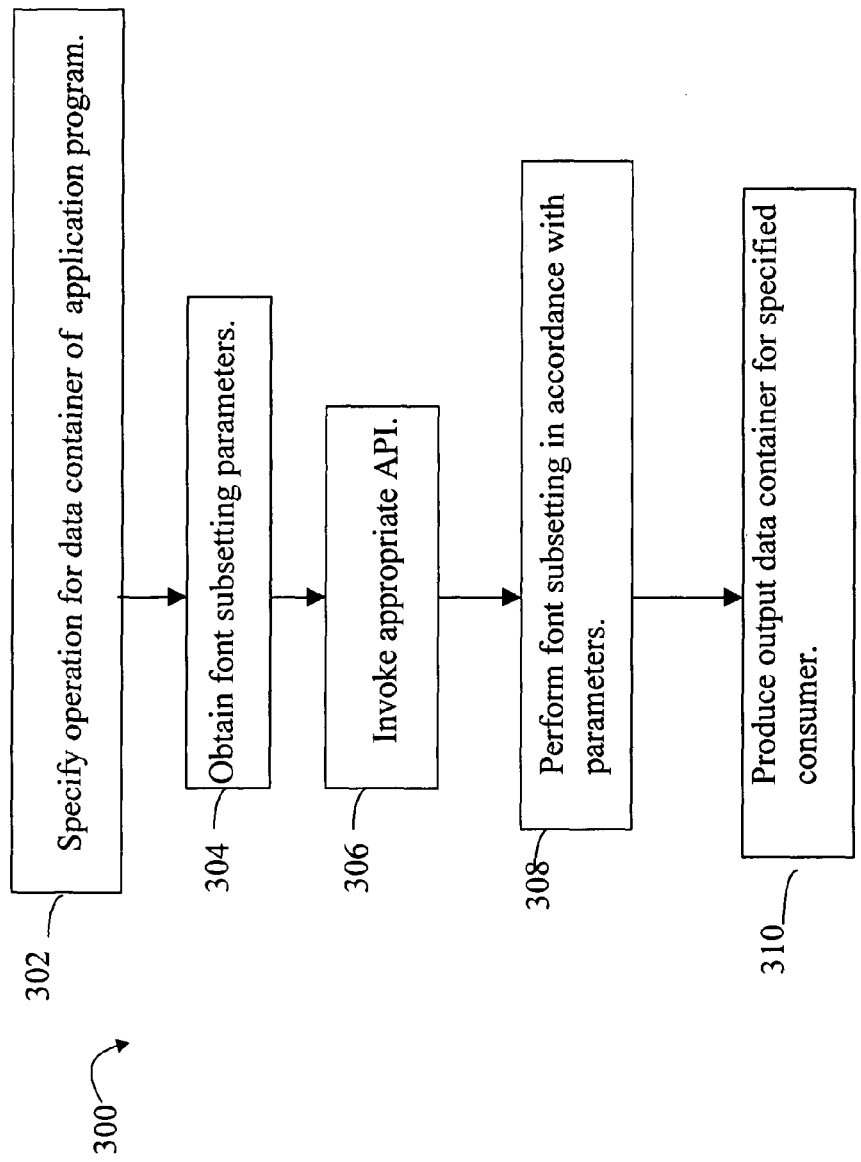
FIGS. 5-6 are flowcharts of processing steps that may be performed in an embodiment utilizing the techniques described herein.

Referring now to FIG. 5, shown is a flowchart summarizing processing steps that may be performed in an embodiment utilizing the techniques described herein. The steps of flowchart 400 summarize processing described, for example, in connection with the components of FIG. 3. At step 302, an operation, such as a print operation, is specified to be performed for the data container currently in use by the application program. The application program may, for example, read in data from an XPS data container. A user of the application program may subsequently wish to print the data container by issuing such a command via a user interface of the application program. At step 304, font subsetting parameters, and optionally other parameters that may be used in connection with the operation specified in step 302, may be obtained. In one embodiment, as described herein, these parameters may be specified by the producer in the form of a policy in accordance with the particular consumer, which in this example is a particular printer. Other techniques may also be used as described herein in obtaining the font subsetting parameters used in determining the font subsetting granularity level. At step 306, the appropriate API may be invoked. An embodiment may include utilize any one of many APIs that may be included in an embodiment in accordance with the particular supported data container types and associated formats. At step 308, font subsetting is performed in accordance with the font subsetting granularity level determined using the font subsetting parameters. At step 310, the output data container is produced for the specified consumer.

Figure 6:
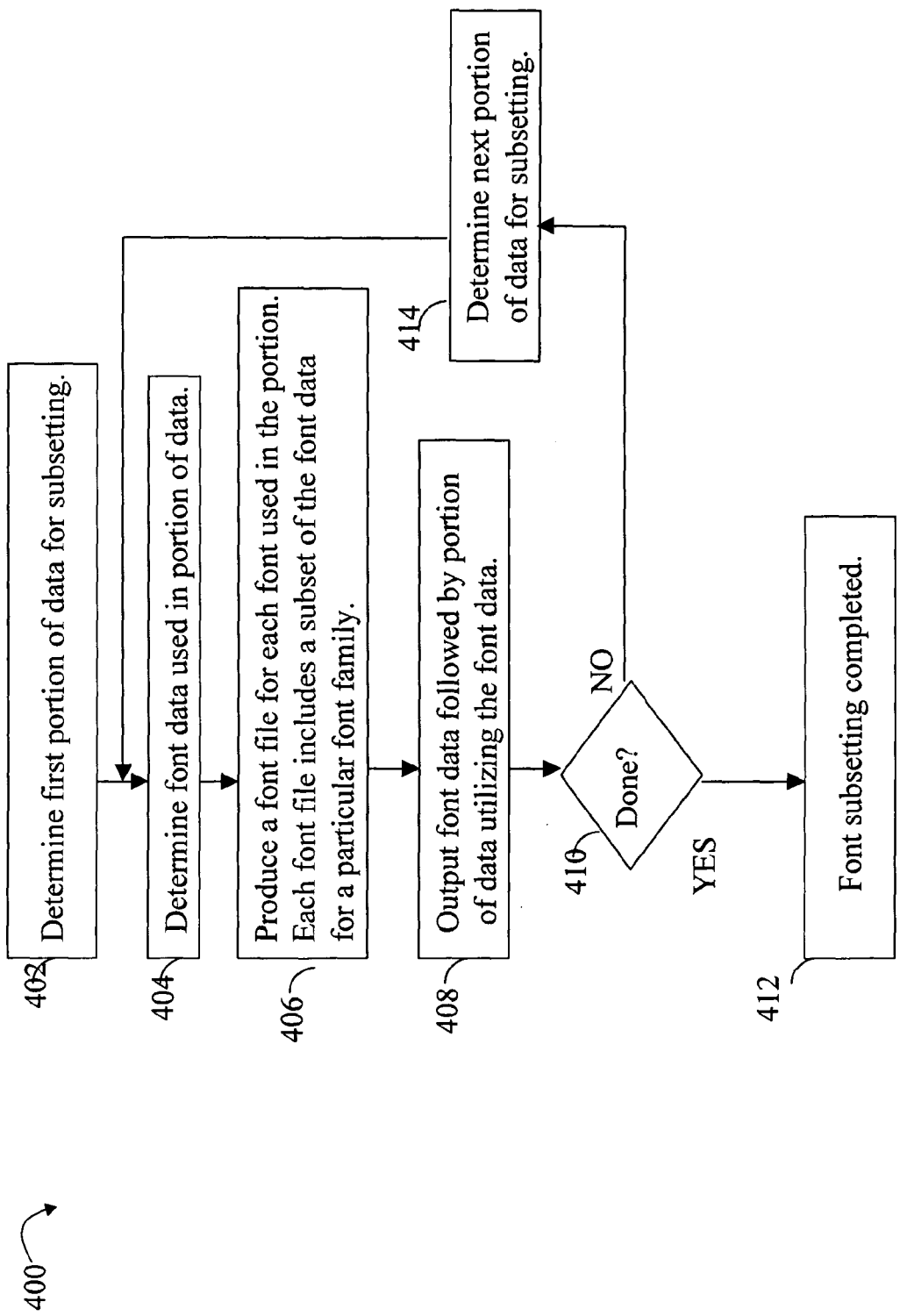

Referring now to FIG. 6, shown is a flowchart of processing steps that may be performed in an embodiment in connection with performing font subsetting. The steps of flowchart 400 set forth in more detail the processing of step 308 of FIG. 5. As described herein, font subsetting may be performed for any specified portion of data to be consumed by a consumer, such as a printer or other device. The font subsetting level of granularity may be indicated by a policy. The policy may be specified by the producer, such as an application program, using one or more parameter values. Font subsetting may be performed for data portions of one or more documents as well as portions of a single document. Font subsetting may be performed for a particular number of one or more pages in a document or a smaller level of granularity defined for regions or portions of a page. The particular level of granularity that may be specified may vary with embodiment as well as the type and/or format of the data container. At step 402, the first portion of data for which font subsetting is performed is determined. The portion of data is determined in accordance with the specified font subsetting granularity level. At step 404, the font data used in the data portion of step 402 is determined. As illustrated in connection with FIG. 4, this font data may be associated with one or more font families as may be used in the portion of data determined at step 402. At step 406, a font file is produced for each font used in the data portion. Each of the font files includes a subset of the font data for a particular font family as used by the data portion. With reference to FIG. 4, for example, Pages 1-3 used two different fonts, Font A and Font B, and the generated data container illustrated includes two font files, each containing the appropriate subsets thereof. At step 408, the font data is output followed by the corresponding data portion utilizing the font data and may be transmitted to the particular consumer. At step 410, a determination is made as to whether processing of all data in the input data container, such as 102 of FIG. 3, is complete. If so, control proceeds to step 412 where font subsetting is complete. Otherwise, control proceeds to step 414 to determine the next portion of the input data container for which font subsetting is to be performed. Control then proceeds to step 404 to continue with font subsetting for the specified data portion.

The foregoing allows for policy-based specification of font subsetting. In one embodiment, the producer may specify the font subsetting granularity level allowing the producer to target generated data containers for different consumers. Also described in the foregoing are other techniques for specifying the font subsetting granularity level using non-producer specified parameter values such as, for example, using automatic font subsetting techniques.

Although particular producers and consumers utilizing the techniques described herein may be set forth for purposes of illustration, those skilled in the art will appreciate the different producer and consumers that may utilize these techniques. A printer is an example of a consumer and an application program is an example of a producer. The techniques described herein may be used in connection with other data streaming operations for supporting streaming consumption of generated data containers that embed the font subsets.

It should be noted that the techniques described herein may be used in connection with optimizing consumption. The generated container of a particular type and/or format produced using the font subsetting techniques described herein may be consumed by any consumer which is capable of processing the particular type and/or container format. Utilizing the techniques herein for specifying varying levels of font subsetting granularity allows for different consumers to be more efficient.

It should be noted that the components described herein in connection with the font subsetting techniques may be implemented in hardware and/or software utilizing any one or more different programming languages. Additionally, an embodiment utilizing the components of FIG. 3 may perform processing such that the source data container 102 is the same, or different, type and/or format with respect to the generated data container 114. For example, an embodiment may include functionality to operate on a container 102 which is a word processing document to produce a generated container 114 which is also a word processing document, or a document in another format, such as a PDF document, text file, file for printer consumption, and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method performed by computing device executing computer-executable instructions stored on a computer readable storage medium for performing font subsetting, the method comprising:
   determining that font subsetting is to be performed for a plurality of documents to be included in a data container to be generated;
   determining a particular font subsetting granularity level for which font subsetting is to be performed for the documents from parameters values associated with a consumer for a set of font subsetting parameters, wherein:
the particular font subsetting granularity level is determined from available font subsetting granularity levels including: font subsetting at a single document level for detecting all font data used in a single document, font subsetting at a page level for detecting all font data used in single page, font subsetting at a multiple page level for detecting all font data used in a specified number of pages, and font subsetting at a region of a page level for detecting all font data used in a specified portion of a page;
the set of font subsetting parameters includes: a document sequence parameter for specifying that the particular font subsetting level is to be performed across all documents included in the data container, a document parameter for specifying that font subsetting at the single document level is to be performed, a count parameter associated with the document parameter for specifying a number of documents for which font subsetting at the single document level is to be performed, a page parameter for specifying that font subsetting at the page level is to be performed, a count parameter associated with the page parameter for specifying a number of pages at which font subsetting at the multiple page level is to be performed, and a page subdivision parameter for specifying a portion of a page at which font subsetting at the region of a page level is to be performed; and
the parameter values associated with the consumer for the set of font subsetting parameters are based on one or more of: empirically determined heuristics based on observed data and information communicated by at least one component associated with the consumer;
determining consecutive portions of the data container in accordance with the particular font subsetting granularity level;
determining document data for each consecutive portion of the data container in accordance with the particular font subsetting granularity level;
determining, based on the document data for each consecutive portion, all font data used in each consecutive portion;
generating the data container including the document data of each consecutive portion;
embedding, in the data container, all of the font data used in each consecutive portion with the document data of each consecutive portion; and
outputting the data container to the consumer, wherein all of the font data which is used in each consecutive portion and embedded in the data container is self contained with respect to all of the font data which is used in each other portion and embedded in the data container to allow the consumer to:
process a first portion of the data container using all of the font data which is used in the first portion and embedded in the data container,
discard, from the data container without caching, all of the font data used to process the first portion of the data container, and
process a consecutive portion of the data container using all of the font data which is used in the consecutive portion and embedded in the data container without using the discarded font data which was used to process the first portion.

2. The method of claim 1, further comprising:
determining a plurality of font files associated with each consecutive portion, each font file representing a font family and including a subset of font data for the font family; and
embedding the plurality of font files associated with each consecutive portion in the data container for output to the consumer.

3. The method of claim 2, wherein the font files of a particular portion are positioned in the data container prior to the document data of the particular portion.

4. The method of claim 1, wherein the consumer is at least one of a printer, a print driver, and a display program.

5. The method of claim 1, wherein the data container is generated by an application program.

6. The method of claim 1, wherein the parameter values associated with the consumer for the set of font subsetting parameters includes an integer value for the count parameter associated with the page parameter when the particular font subsetting granularity level is font subsetting at the multiple page level.

7. The method of claim 1, wherein the parameters values associated with the consumer for the set of font subsetting parameters includes an integer value for the count parameter associated with the document parameter when the particular font subsetting granularity level is font subsetting at the single document level which is to be performed for a plurality of documents included in the data container but not for all documents included in the data container.

8. The method of claim 1, wherein:
the particular font subsetting granularity level is font subsetting at the multiple page level;
the count parameter associated with the page parameter specifies an integer value of n, where n>b 1;
the first portion of the data container includes all of the font data used in the first n pages of a single document; and
the consecutive portion of the data container includes all of the font data used in the next n pages of the single document.

9. The method of claim 1, wherein:
the particular font subsetting granularity level is font subsetting at the region of a page level; and
the first portion of the data container and the consecutive portion of the data container each include font data for less than a single page of a single document.

10. The method of claim 1, wherein the consumer is performing a data streaming operation.

11. The method of claim 1, wherein:
the particular font subsetting granularity level is font subsetting at the single document level;
the count parameter associated with the document parameter specifies an integer value of n, where n>1; and
the data container is processed by performing font subsetting at the single document level for n documents included in the data container.

12. The method of claim 1, wherein the parameter values associated with consumer for the set of font subsetting parameters are automatically determined by an automatic font subsetting component.

13. The method of claim 1, wherein the observed data includes statistical data gathered over a period of time.

14. The method of claim 1, wherein the particular font subsetting granularity level is determined dynamically during operation of the at least one component associated with the consumer at runtime.

15. A computer readable storage medium having computer executable instructions stored thereon for performing steps for font subsetting, the steps comprising:

determining that font subsetting is to be performed for a plurality of documents to be included in a data container to be generated;

determining a particular font subsetting granularity level for which font subsetting is to be performed for the documents from parameters values associated with a consumer for a set of font subsetting parameters, wherein:

the particular font subsetting granularity level is determined from available font subsetting granularity levels including: font subsetting at a single document level for detecting all font data used in a single document, font subsetting at a page level for detecting all font data used in single page, font subsetting at a multiple page level for detecting all font data used in a specified number of pages, and font subsetting at a region of a page level for detecting all font data used in a specified portion of a page;

the set of font subsetting parameters includes: a document sequence parameter for specifying that the particular font subsetting level is to be performed across all documents included in the data container, a document parameter for specifying that font subsetting at the single document level is to be performed, a count parameter associated with the document parameter for specifying a number of documents for which font subsetting at the single document level is to be performed, a page parameter for specifying that font subsetting at the page level is to be performed, a count parameter associated with the page parameter for specifying a number of pages at which font subsetting at the multiple page level is to be performed, and a page subdivision parameter for specifying a portion of a page at which font subsetting at the region of a page level is to be performed; and the parameter values associated with the consumer for the set of font subsetting parameters are based on one or more of: empirically determined heuristics based on observed data and information communicated by at least one component associated with the consumer;

determining consecutive portions of the data container in accordance with the particular font subsetting granularity level;

determining document data for each consecutive portion of the data container in accordance with the particular font subsetting granularity level;

determining, based on the document data for each consecutive portion, all font data used in each consecutive portion;

generating the data container including the document data of each consecutive portion;

embedding, in the data container, all of the font data used in each consecutive portion with the document data of each consecutive portion; and outputting the data container to the consumer, wherein all of the font data which is used in each consecutive portion and embedded in the data container is self contained with respect to all of the font data which is used in each other portion and embedded in the data container to allow the consumer to:

process a first portion of the data container using all of the font data which is used in the first portion and embedded in the data container, discard, from the data container without caching, all of the font data used to process the first portion of the data container, and process a consecutive portion of the data container using all of the font data which is used in the consecutive portion and embedded in the data container without using the discarded font data which was used to process the first portion.

16. The computer readable storage medium of claim 15, the steps further comprising:

determining a plurality of font files for each consecutive portion, each font file representing a font family used in the consecutive portion and including a subset of font data for the font family; and embedding the plurality of font files associated with each consecutive portion in the data container for output to the consumer.

17. A computing device comprising a computer readable storage medium and one or more processing units executing computer-executable instructions stored on the computer readable storage medium for performing a font subsetting method, the font subsetting method comprising:

determining that font subsetting is to be performed for a plurality of documents to be included in a data container to be generated;

determining a particular font subsetting granularity level for which font subsetting is to be performed for the documents from parameters values associated with a consumer for a set of font subsetting parameters, wherein:

the particular font subsetting granularity level is determined from a plurality of available font subsetting granularity levels including: font subsetting at a single document level for detecting all font data used in a single document, font subsetting at a page level for detecting all font data used in single page, font subsetting at a multiple page level for detecting all font data used in a specified number of pages, and font subsetting at a region of a page level for detecting all font data used in a specified portion of a page;

the set of font subsetting parameters includes: a document sequence parameter for specifying that the particular font subsetting level is to be performed across all documents included in the data container, a document parameter for specifying that font subsetting at the single document level is to be performed, a count parameter associated with the document parameter for specifying a number of documents for which font subsetting at the single document level is to be performed, a page parameter for specifying that font subsetting at the page level is to be performed, a count parameter associated with the page parameter for specifying a number of pages at which font subsetting at the multiple page level is to be performed, and a page subdivision parameter for specifying a portion of a page at which font subsetting at the region of a page level is to be performed; and the parameter values associated with the consumer for the set of font subsetting parameters are based on one or more of: empirically determined heuristics based on observed data and information communicated by at least one component associated with the consumer;

determining consecutive portions of the data container in accordance with the particular font subsetting granularity level;

determining document data for each consecutive portion of the data container in accordance with the particular font subsetting granularity level;

determining, based on the document data for each consecutive portion, all font data used in each consecutive portion;

generating the data container including the document data of each consecutive portion;

embedding, in the data container, all of the font data used in each consecutive portion with the document data of each consecutive portion; and outputting the data container to the consumer, wherein all of the font data which is used in each consecutive portion and embedded in the data container is self contained with respect to all of the font data which is used in each other portion and embedded in the data container to allow the consumer to:

process a first portion of the data container using all of the font data which is used in the first portion and embedded in the data container, discard, from the data container without caching, all of the font data used to process the first portion of the data container, and process a consecutive portion of the data container using all of the font data which is used in the consecutive portion and embedded in the data container without using the discarded font data which was used to process the first portion.

18. The computing device of claim 17, wherein:

the particular font subsetting granularity level is font subsetting at the multiple page level;

the count parameter associated with the page parameter specifies an integer value of n, where n>1;

the first portion of the data container includes all of the font data used in the first n pages of a single document; and the consecutive portion of the data container includes all of the font data used in the next n pages of the single document.

19. The computing device of claim 17, wherein:

the particular font subsetting granularity level is font subsetting at the region of a page level; and the first portion of the data container and the consecutive portion of the data container each include font data for less than a single page of a single document.

20. The computing device of claim 17, wherein:

the particular font subsetting granularity level is font subsetting at the single document level;

the count parameter associated with the document parameter specifies an integer value of n, where n>1; and the data container is processed by performing font subsetting at the single document level for n documents included in the data container.

* * * * *

UNITED STATES PATENT AND TRADEMARK OFFICE
CERTIFICATE OF CORRECTION

| | | |
|---|---|---|
| PATENT NO. | : 8,040,533 B2 | Page 1 of 1 |
| APPLICATION NO. | : 11/327678 | |
| DATED | : October 18, 2011 | |
| INVENTOR(S) | : Brian S. Adelberg et al. | |

It is certified that error appears in the above-identified patent and that said Letters Patent is hereby corrected as shown below:

In column 12, line 33, In Claim 8, after "n>" delete "b".

Signed and Sealed this
Sixth Day of December, 2011

David J. Kappos
*Director of the United States Patent and Trademark Office*